US008339166B2

(12) United States Patent
John et al.

(10) Patent No.: US 8,339,166 B2
(45) Date of Patent: Dec. 25, 2012

(54) CLOCK GATER WITH PROGRAMMABLE DELAY

(75) Inventors: Deepesh John, Austin, TX (US); Sundararajan Rangarajan, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 118 days.

(21) Appl. No.: 12/948,633

(22) Filed: Nov. 17, 2010

(65) Prior Publication Data

US 2012/0119805 A1    May 17, 2012

(51) Int. Cl.
*H03L 7/06*    (2006.01)
(52) U.S. Cl. .......... 327/156; 327/158; 327/161; 326/38; 326/39

(58) Field of Classification Search .............. 327/156, 327/158, 161; 326/38
See application file for complete search history.

(56) References Cited

U.S. PATENT DOCUMENTS 7,583,103 B2 *  9/2009  Lewis et al. ............... 326/38
8,212,585 B1 *  7/2012  Price ........................ 326/39

* cited by examiner

*Primary Examiner* — John Poos
(74) *Attorney, Agent, or Firm* — Williams, Morgan & Amerson, P.C.

(57) ABSTRACT

An integrated circuit device includes first circuitry including first logic devices and a clock tree for distributing a clock signal to the first logic devices and second circuitry including second logic devices and a clock gater operable to receive the clock signal and distribute the clock signal to the second logic devices. The clock gater comprises a programmable delay circuit.

19 Claims, 5 Drawing Sheets

CLOCK GATER WITH PROGRAMMABLE DELAY

CROSS-REFERENCE TO RELATED APPLICATIONS

Not applicable.

BACKGROUND

The disclosed subject matter relates generally to manufacturing and, more particularly, to a clock gater with a programmable delay.

Integrated circuit devices are typically designed using a combination of automated design techniques and manual design techniques. The portions of the design layout generated by computer tools are commonly referred to as tiles, and the portions of the design layout manually generated by circuit designers are commonly referred to as macros.

In a synchronous digital system, the clock signal is used to define a time reference for the movement of data within that system. The clock distribution network (i.e., or clock tree, when this network forms a tree) distributes the clock signal(s) from a common point to all the elements that need it. The clock signal is distributed to tiles as well as macros.

One portion of an integrated circuit that is commonly at least partially designed by computer assisted design (CAD) tools is the clock tree. Within a tile, the synthesis tool generates a tree that starts with the core clock signal (CCLK) and branches to all of the state elements in the tile. The number of stages in the clock tree is a parameter that may change during the evolution of the design. For a macro, the clock tree, the logic is placed and routed by custom design.

During the design process, the designs of computer generated tiles and the custom macros proceed at different rates. It is common for tile synthesis operations to continue after the macro designs have been completed. A synthesis operation may yield a change in the number of stages in the clock tree. In order to simulate the integrated circuit device operation during the design process, the clock trees in the macros need to be consistent with those in the tiles. Also, consistency is required for the final design.

A change in the number of stages in the clock tree for the tile elements requires the manual redesign of the macros to place the logic and routings. This effort requires significant time and effort, and may need to be repeated several times during the design phase.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in an integrated circuit device including first circuitry including first logic devices and a clock tree for distributing a clock signal to the first logic devices and second circuitry including second logic devices and a clock gater operable to receive the clock signal and distribute the clock signal to the second logic devices. The clock gater comprises a programmable delay circuit.

Another aspect of the disclosed subject matter is seen in an integrated circuit device including a first tile and a first macro. The first tile includes first logic devices and a clock tree for distributing a clock signal to the first logic devices. The first macro includes second logic devices and a clock gater operable to receive the clock signal and distribute the clock signal to the second logic devices, wherein the clock gater comprises a programmable delay circuit.

Yet another aspect of the disclosed subject matter is seen in a method that includes providing first circuitry including first logic devices and a clock tree for distributing a clock signal to the first logic devices. The clock tree imposes a first delay on the clock signal to generate a delayed clock signal. Second circuitry including second logic devices and a clock gater operable to receive the clock signal and distribute the clock signal to the second logic devices is provided. The clock gater includes a programmable delay circuit. The programmable delay circuit is configured to impose a second delay on the clock signal to generate a second delayed clock signal.

BRIEF DESCRIPTION OF THE SEVERAL VIEWS OF THE DRAWINGS

The disclosed subject matter will hereafter be described with reference to the accompanying drawings, wherein like reference numerals denote like elements, and.

Figure 1:
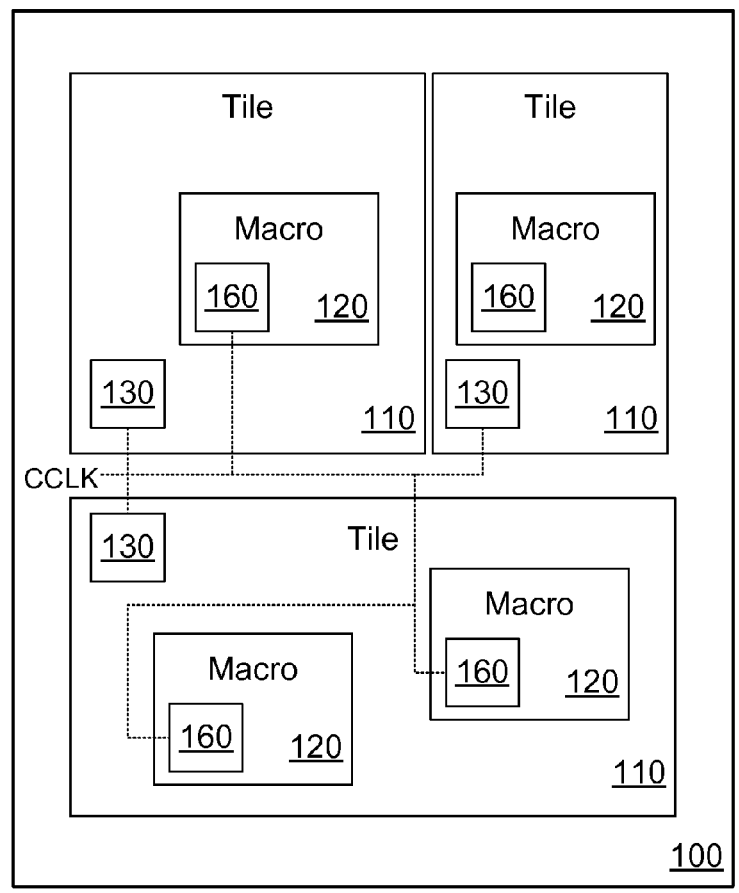
FIG. 1 is a simplified diagram of an integrated circuit device including a clock gater with a programmable delay in accordance with one illustrative embodiment of the present subject matter.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to the drawings wherein like reference numbers correspond to similar components throughout the several views and, specifically, referring to FIG. 1, the disclosed subject matter shall be described in the context of an integrated circuit device 100. The integrated circuit device 100 includes a tile portion 110 and macros 120. Of course the number of tile portions 110 and the number of macros 120 may vary. The integrated circuit device 100 may be a processor such as, for example, a microprocessor, graphics processing unit (GPU), or a digital signal processor, a memory device, etc. Exemplary macros 120 include synchronous random access memory (SRAM) array macros, such as instruction caches, data caches, predictor tables, etc. Multiple instances of some of the macros 120 may be present. The tile portions 100 are typically designed using an automated CAD tool, and the macros 120 are typically designed manually by circuit designers. As part of the design process for the tile portions 110, a clock tree 130 is typically generated. In one embodiment, each tile 110 may have its own clock tree 130. Interfaces may be defined between different tiles 110 or between a macro 120 in one tile 110 and another tile 110 or a macro 120 in a different tile 110.

Figure 2:
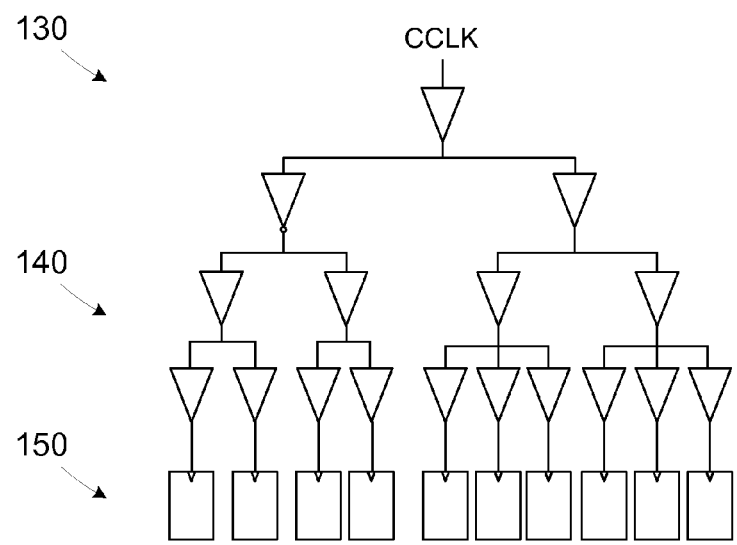
FIG. 2 is a circuit diagram of an exemplary clock tree.

Turning briefly to FIG. 2 an exemplary clock tree 130 is shown. The clock tree 130 has a number of stages 140 that start from the core clock signal (CCLK) and branch to the logic elements 150 in the tile 110. As the design progresses, the number of stages 140 may change. Hence, the amount of delay imposed by the clock tree 130 may change throughout the design process.

Returning to FIG. 1, the macros 120 include a clock gater 160. The clock gater 160 mimics the delay provided in the clock tree 130, so that the clock signal, for the tile 110 is synchronized with the clock signal for the macro 120. In the illustrated embodiment, the clock gater 160 provides a programmable delay, so that its delay can be changed in the event the characteristics of the clock tree 130 change. Also, once the integrated circuit device 100 has been manufactured, the individual timings of the macros 120 may be tuned to increase performance.

Figure 3:
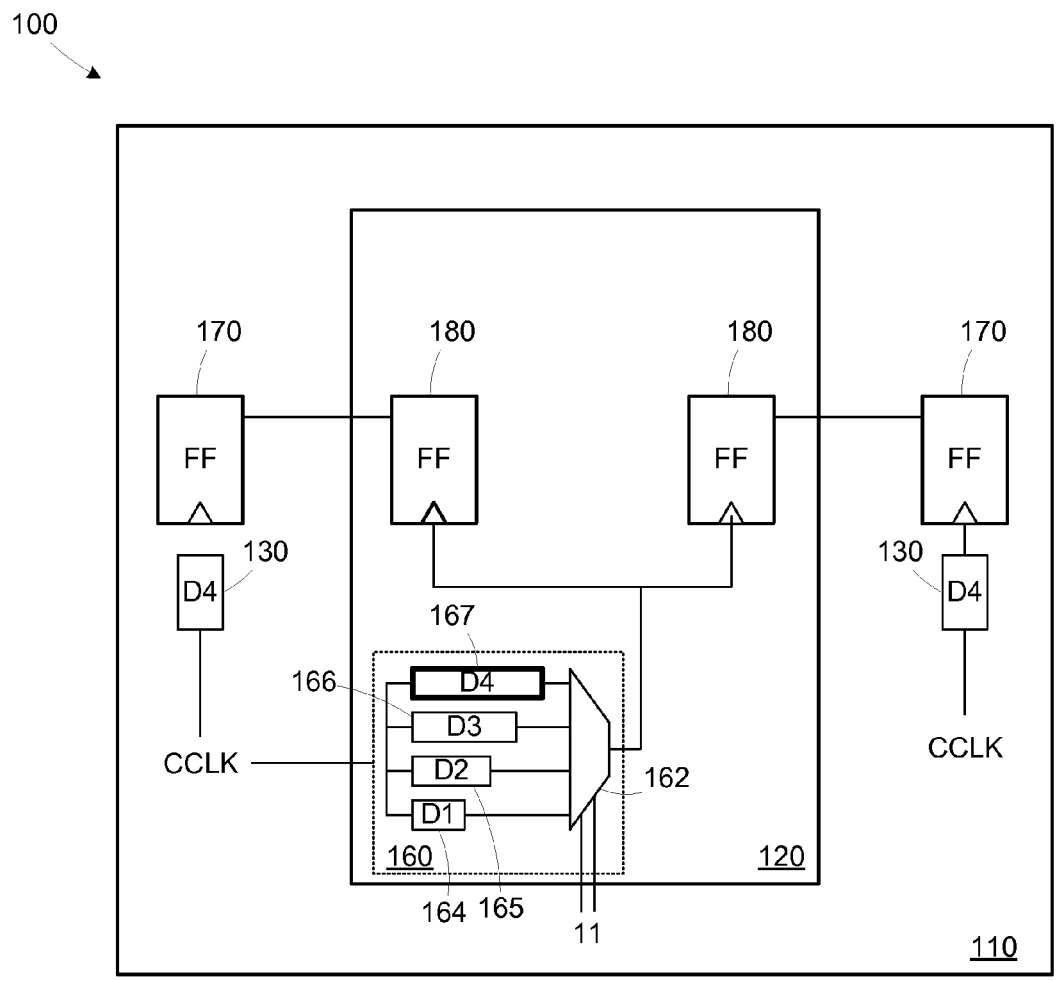
FIGS. 3-4 are simplified diagrams of the device of FIG. 1 illustrating the configuration of the clock gater to adjust to changes in the clock tree.

FIG. 3 is a simplified diagram of a tile 110 including a macro 120. The clock tree 130 for the tile is represented by a delay element. The logic devices 170 (e.g., flip flops) of the tile 110 receive the clock from the clock tree 130, and the logic devices 180 of the macro 120 receive the clock from the clock gater 160. In the illustrated embodiment, the clock gater 160 includes a multiplexer 162 and a plurality of delay elements 164-167. The delay elements 164-167 each impose a different amount of delay on the clock signal. The delay elements 164-167 may be implemented using various logic elements, such as shown in the clock tree 130 of FIG. 2.

In the example illustrated in FIG. 3, the delay imposed by the clock tree 130 is represented as D4. In one embodiment, this may represent 4 stages in the clock tree 130. To synchronize the clock for the macro 120 with that of the tile 110, the multiplexer 162 is configured to select the appropriate delay element 164-167, for example, delay element 167, also corresponding to a delay of D4. For example, the delay element 167 may have four drivers or inverters in series to create the same delay as the clock tree 130. The multiplexer 162 may be configured using a control register of the device or by blowing fuses. During the design phase the blowing of fuses may be simulated. In an actual design, various tests and characterizations may be performed to select the appropriate fuse pattern for the multiplexer 162.

Figure 4:
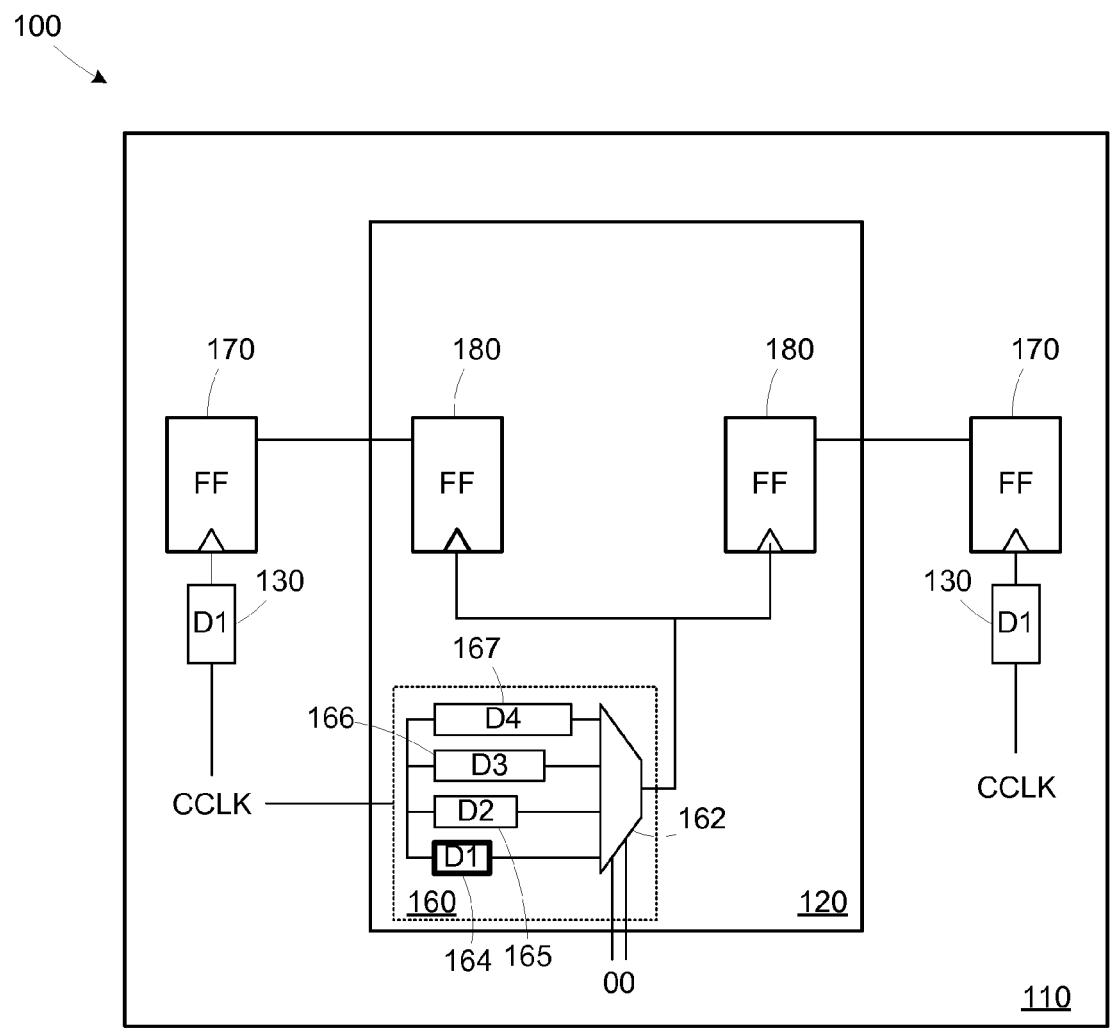

The situation illustrated in FIG. 3 may represent the configuration of the tile 110 and the clock tree 130 at a particular point in the design of the device 100. At a later stage in the design cycle, as represented in FIG. 4, the design of the tile 110 may have been changed by the CAD design tool such that the delay imposed by the clock tree 130 changes to D1. To synchronize the clock for the macro 120 with that of the tile 110, the multiplexer 162 is configured to select the delay element 164, which corresponds to a delay of D1.

Hence, changes in the design of the tile 110 that affect the timing may be addressed simply by reconfiguring the multiplexer 162, thereby avoiding a redesign of the macro 120. In the case where the operation of the integrated circuit device 100 is to be simulated, there is no delay imposed by a macro 120 redesign prior to allowing the simulation to proceed. The need for designer input is also obviated, resulting in decreased engineering costs. Further design iterations can be accounted for simply by reconfiguring the multiplexer 162 to select the delay element 164-167 corresponding to the delay imposed by the clock tree 130. The number of delay elements 164-167 provided in the clock gater 160 may vary depending on the degree of granularity desired for timing changes.

Figure 5:
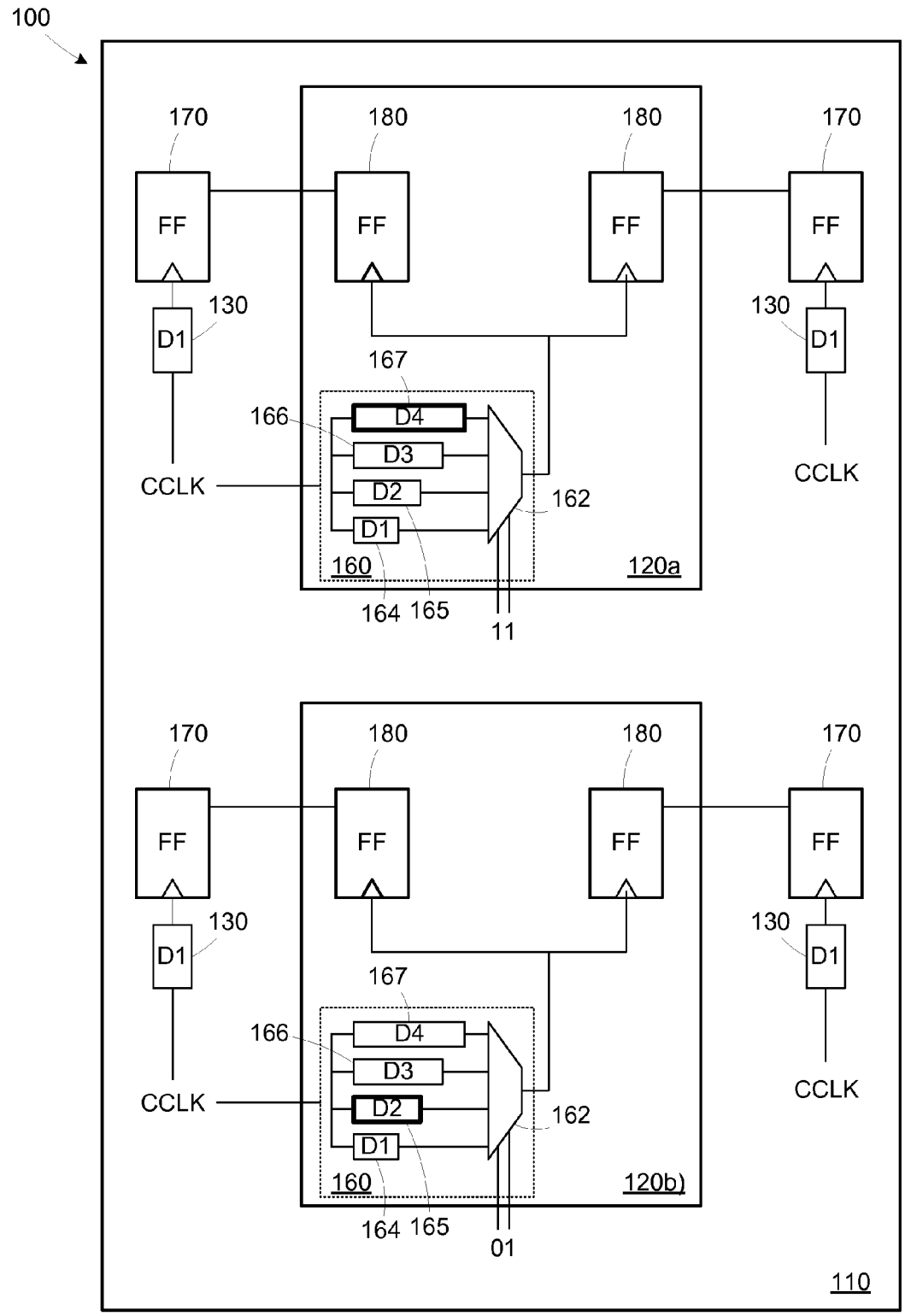
FIG. 5 is a simplified diagram of the device of FIG. 1 illustrating the configuration of the clock gater to tune the timing of the device.

During the design phase, timing testing may be implemented for the design using simulation tools. As illustrated in FIG. 5, the device 100 includes a tile 110 with two instances of the same macro 120a, 120b. Assume the clock tree 130 of the tile 110 has a delay of DEL3. Initially, the multiplexers 162 for the macros 120a, 120b would both be configured to select the delay element 166 to synchronize the tile 110 and the macros 120a, 102b.

During the timing simulation for the device 100, it may be determined that the input signals in the macro 120a are on the critical timing path, while the outputs are not. In the macro 120a, the programmable delay of the clock gater 160 can be increased by configuring the multiplexer 162 to select a longer delay element 167 (i.e., D4). The longer delay allows more time for input signals to set up.

In contrast, consider that the timing simulation also revealed that the output signals of the macro 120b are on the critical timing path. As a result, the programmable delay of the clock gater 160 for the macro 120b can be decreased by configuring the multiplexer 162 to select a shorter delay element 165 (i.e., D2). The longer delay allows the output signals to be generated slightly earlier.

The previous example of FIG. 5 shows the tuning of macro delay while running timing simulation on the tile 110. However the longest timing paths in timing analysis may not correspond to the longest timing paths when the device 100 is actually fabricated. Hence, once the design of the integrated circuit device is completed, and the device 100 has been fabricated, the clock gaters 160 for one or more macros 120 may be tuned to increase the actual performance of the device by further adjusting the macro interface timing.

Although the examples of FIGS. 3-5 illustrate timing interfaces between a macro 120 and the tile 110 in which it is formed, it is contemplated that the timing interface may be defined between the macro 120 and a different tile 110 in the case where multiple tiles are present in the integrated circuit device.

Figure 6:
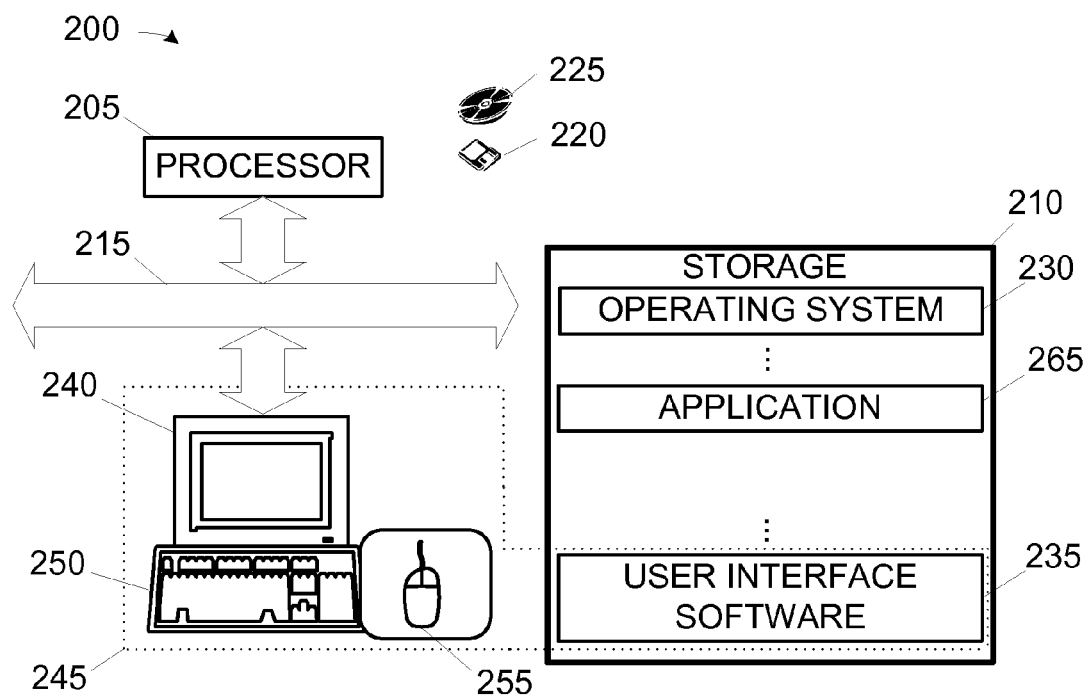
FIG. 6 is a simplified diagram of a computing apparatus that may be programmed to direct the fabrication of the integrated circuit device of FIG. 1.

FIG. 6 illustrates a simplified diagram of selected portions of the hardware and software architecture of a computing apparatus 200 such as may be employed in some aspects of the present subject matter. The computing apparatus 200 includes a processor 205 communicating with storage 210 over a bus system 215. The storage 210 may include a hard disk and/or random access memory ("RAM") and/or removable storage, such as a magnetic disk 220 or an optical disk 225. The storage 210 is also encoded with an operating system 230, user interface software 235, and an application 265. The user interface software 235, in conjunction with a display 240, implements a user interface 245. The user interface 245 may include peripheral I/O devices such as a keypad or keyboard 250, mouse 255, etc. The processor 205 runs under the control of the operating system 230, which may be practically any operating system known in the art. The application 265 is invoked by the operating system 230 upon power up, reset, user interaction, etc., depending on the implementation of the operating system 230. The application 265, when invoked, performs a method of the present subject matter. The user may invoke the application 265 in conventional fashion through the user interface 245. Note that although a stand-alone system is illustrated, there is no need for the data to reside on the same computing apparatus 200 as the application 265 by which it is processed. Some embodiments of the present subject matter may therefore be implemented on a distributed computing system with distributed storage and/or processing capabilities.

It is contemplated that, in some embodiments, different kinds of hardware descriptive languages (HDL) may be used in the process of designing and manufacturing very large scale integration circuits (VLSI circuits), such as semiconductor products and devices and/or other types semiconductor devices. Some examples of HDL are VHDL and Verilog/Verilog-XL, but other HDL formats not listed may be used. In one embodiment, the HDL code (e.g., register transfer level (RTL) code/data) may be used to generate GDS data, GDSII data and the like. GDSII data, for example, is a descriptive file format and may be used in different embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage device (e.g., storage 210, disks 220, 225, solid state storage, and the like). In one embodiment, the GDSII data (or other similar data) may be adapted to configure a manufacturing facility (e.g., through the use of mask works) to create devices capable of embodying various aspects of the instant invention. In other words, in various embodiments, this GDSII data (or other similar data) may be programmed into the computing apparatus 200, and executed by the processor 205 using the application 265, which may then control, in whole or part, the operation of a semiconductor manufacturing facility (or fab) to create semiconductor products and devices. For example, in one embodiment, silicon wafers containing the tiles 110, macros 120, clock gaters 160 may be created using the GDSII data (or other similar data).

It is also contemplated that the computing apparatus 200 and the application 265 may be used to perform performance modeling of the integrated circuit device 100. For example, a timing analysis of the tiles 100 and macros 120 may be performed as described above to identify critical timing paths and adjust the clock gaters 160 accordingly.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. An integrated circuit device, comprising:
   first circuitry including first logic devices and a clock tree for distributing a clock signal to the first logic devices; and
   second circuitry including second logic devices and a clock gater operable to receive the clock signal and distribute the clock signal to the second logic devices, wherein the clock gater comprises a programmable delay circuit including a plurality of delay elements, each imposing a different amount of delay and a multiplexer coupled to receive the clock signal and configurable to select one of the plurality of delay elements having a delay corresponding to a first delay imposed by the clock tree.

2. The device of claim 1, wherein the multiplexer is configured to select one of the plurality of delay elements having a delay less than the first delay.

3. The device of claim 1, wherein the multiplexer is configured to select one of the plurality of delay elements having a delay greater than the first delay.

4. The device of claim 1, wherein the first circuitry comprises a first instance of a macro including the second circuitry, and the integrated circuit device further comprises a second instance of the macro including a second clock gater with a second programmable delay circuit, wherein the programmable delay circuit for the first instance of the macro is configured to impose a first delay, and the second programmable delay circuit for the second instance of the macro is configured to impose a second delay different from the first delay.

5. The device of claim 1, wherein the second circuitry comprises a synchronous random access memory array.

6. An integrated circuit device, comprising:
   a first tile including first logic devices and a clock tree for distributing a clock signal to the first logic devices; and
   a first macro including second logic devices and a clock gater operable to receive the clock signal and distribute the clock signal to the second logic devices, wherein the clock gater comprises a programmable delay circuit including a plurality of delay elements, each imposing a different amount of delay and a multiplexer coupled to receive the clock signal and configurable to select one of the plurality of delay elements having a delay corresponding to a first delay imposed by the clock tree.

7. The device of claim 6, wherein the multiplexer is configured to select one of the plurality of delay elements having a delay less than the first delay.

8. The device of claim 6, wherein the multiplexer is configured to select one of the plurality of delay elements having a delay greater than the first delay.

9. The device of claim 6, wherein the first macro comprises a first instance of the first macro, and the integrated circuit device further comprises a second instance of the first macro including a second clock gater with a second programmable delay circuit, wherein the programmable delay circuit for the first instance of the first macro is configured to impose a first delay, and the second programmable delay circuit for the second instance of the first macro is configured to impose a second delay different from the first delay.

10. The device of claim 6, wherein the first macro comprises a synchronous random access memory array.

11. The device of claim 6, wherein the first macro is defined in the first tile.

12. The device of claim 6, further comprising a second tile including third logic devices, wherein the first macro is defined in the second tile.

13. A method, comprising:
   providing first circuitry including first logic devices and a clock tree for distributing a clock signal to the first logic devices, the clock tree imposing a first delay on the clock signal to generate a delayed clock signal;
   providing second circuitry including second logic devices and a clock gater operable to receive the clock signal and distribute the clock signal to the second logic devices, wherein the clock gater comprises a programmable delay circuit including a plurality of delay elements, each imposing a different amount of delay, and a multiplexer coupled to receive the clock signal and coupled to the plurality of delay elements,; and
   configuring the programmable delay circuit to impose a second delay on the clock signal to generate a second delayed clock signal by configuring the multiplexer to select one of the plurality of delay elements having a delay corresponding to the first delay.

14. The method of claim 13, wherein configuring the multiplexer further comprises configuring the multiplexer to select one of the plurality of delay elements having a delay less than the first delay.

15. The method of claim 13, wherein configuring the multiplexer further comprises configuring the multiplexer to select one of the plurality of delay elements having a delay greater than the first delay.

16. The method of claim 13, wherein the first circuitry comprises a first instance of a macro, and the method further comprises:
   providing third circuitry implementing a second instance of the macro, the third circuitry including third logic devices and a second clock gater operable to receive the clock signal and distribute the clock signal to the third logic devices, wherein the second clock gater comprises a second programmable delay circuit; and
   configuring the second programmable delay circuit for the second instance of the macro to impose a third delay different than the second delay imposed by the programmable delay circuit of the first instance of the macro.

17. The method of claim 13, wherein the second circuitry comprises a synchronous random access memory array.

18. A non-transitory computer readable storage device encoded with data that, when implemented in a manufacturing facility, adapts the manufacturing facility to create an apparatus, comprising:
   first circuitry including first logic devices and a clock tree for distributing a clock signal to the first logic devices; and
   second circuitry including second logic devices and a clock gater operable to receive the clock signal and distribute the clock signal to the second logic devices, wherein the clock gater comprises a programmable delay circuit including a plurality of delay elements, each imposing a different amount of delay and a multiplexer coupled to receive the clock signal and configurable to select one of the plurality of delay elements having a delay corresponding to a first delay imposed by the clock tree.

19. The non-transitory computer readable storage device of claim 18, encoded with data that, when implemented in the manufacturing facility, adapts the manufacturing facility to create the apparatus, wherein the first circuitry comprises a first instance of a macro including the second circuitry, and the integrated circuit device further comprises a second instance of the macro including a second clock gater with a second programmable delay circuit, wherein the programmable delay circuit for the first instance of the macro is configured to impose a first delay, and the second programmable delay circuit for the second instance of the macro is configured to impose a second delay different from the first delay.

* * * * *